United States Patent [19]

Rubalcava

[11] 4,326,733
[45] Apr. 27, 1982

[54] HYDRO-PNEUMATIC SUSPENSIONS FOR AUTOMOTIVE VEHICLES

[76] Inventor: Carlos A. Rubalcava, Hornedo No. 116, Aguascalientes, Mexico

[21] Appl. No.: 84,311

[22] Filed: Oct. 12, 1979

[30] Foreign Application Priority Data

Oct. 13, 1978 [MX] Mexico .................................. 175201

[51] Int. Cl.³ ............................................ B60G 11/26
[52] U.S. Cl. .................................. 280/708; 267/8 R
[58] Field of Search ............... 280/689, 697, 698, 702, 280/708, 711, 712; 267/8 R, DIG. 1; 188/283

[56] References Cited

U.S. PATENT DOCUMENTS

| | | | |
|---|---|---|---|
| 2,529,898 | 11/1950 | Batik | 280/708 |
| 2,933,104 | 4/1960 | Jackson | 280/711 |
| 2,970,848 | 2/1961 | Rice | 280/711 |
| 3,736,001 | 5/1973 | Capgras | 280/708 |

FOREIGN PATENT DOCUMENTS

| | | |
|---|---|---|
| 2263097 | 7/1973 | Fed. Rep. of Germany ... 267/DIG. 1 |
| 2616839 | 10/1977 | Fed. Rep. of Germany ...... 280/702 |

*Primary Examiner*—Joseph F. Peters, Jr.
*Assistant Examiner*—Ross Weaver
*Attorney, Agent, or Firm*—Roylance, Abrams, Berdo & Farley

[57] ABSTRACT

A hydro-pneumatic suspension for automotive vehicles has two hydro-pneumatic shock absorbers per wheel. The shock absorbers are installed on a chassis of two C-shaped sections facing each other. A carrier fixed to the vehicle axle is pivotally coupled to the shock absorbers by rocker arms and swings. A protective rubber stop is fixed to the carrier. A reserve oil tank is coupled to the chassis between the shock absorbers and includes an oil level valve. The hydro-pneumatic suspension absorbs shock and increases the stability of the vehicle.

20 Claims, 4 Drawing Figures

HYDRO-PNEUMATIC SUSPENSIONS FOR AUTOMOTIVE VEHICLES

BACKGROUND OF THE INVENTION

The present invention refers to improvements in hydro-pneumatic suspensions for road vehicles, by means of which smoother operation of the vehicles is achieved. Additionally, greater safety is achieved because of the improved recovery of stability when the vehicle tends to lean to one side on a curve or when it swerves sharply, due to centrifugal force. This is in contrast to existing systems which 'give' to the weight of the load and to the centrifugal force itself, thereby endangering the lives of the passengers and the unit itself.

The tendency on the art of the automotive engineers in the designing of suspensions for buses and trucks, has been to obtain a smoother and more comfortable running of the vehicle over the unevenness of the road.

The designs that have been most used commercially have been the following:
1. Suspension with a fixed axle.
2. Suspension with a fixed axle with leaf springs.
3. Suspension with shock absorbers and helical springs.
4. Shock absorber suspension, helical springs and twin axles.
5. Suspension with rigid axle and leaf springs of variable ratio.
6. Suspension with a rigid axle and radial leaf springs with a progressive ratio.
7. Suspension with leaf springs and air bags.
8. Suspensions with torque rods.
9. Air suspensions.
10. Hydro-pneumatic suspensions.

By means of innovations these systems have been able to reduce the amplitude of the vertical vibrations, which in the spring suspensions vary between 179 and 655 (cpm); and which in air and hydro-pneumatic suspensions have a vibration range of 138 to 197 (cmp). This is essentially constant.

The hydro-pneumatic suspension of the present invention, satisfies the following parameters of design, operation and control:
1. Control of vertical movement.
2. Control of angular movement between frame and axle.
3. Control of lateral displacement.
4. Control of rotation from brake torque.

The hydro-pneumatic suspension principle has been patented in various countries for use in automotive vehicles, each one with different component design and installation geometry.

In U.S. Pat. No. 3,736,001, the use of one hydro-pneumatic cylinder per wheel is specified. The cylinder is anchored to the chassis and the load axle by means of a ball and socket arm and pivoted support. In the present invention, two hydro-pneumatic cylinders of special design are used per wheel to diminish the operating forces and fatigue by 50%. In this way a greater load capacity and longer life of the system is obtained.

Reference is made to my Mexican Pat. No. 111487 which also discloses the use of a hydro-pneumatic shock absorber suspension. The disclosed shock absorber simplifies the system in general, with which a considerable reduction of parts is obtained and with the consequent reduction in the cost of manufacture.

SUMMARY OF THE INVENTION

One objective of the invention is to provide a hydro-pneumatic suspension having hydro-pneumatic shock absorbers with a special geometric design, in which the forces generated at the axle of the vehicle are assimilated by the hydro-pneumatic shock absorbers. The shock absorbers are designed and constructed in such a way that when there is a change in the axle of the vehicle, or if there is a leaning over of the vehicle on a curve, both the hydraulic and the pneumatic chambers absorb the force reducing it to a minimum. This results in the following advantages:
(a) Greater comfort for the driver and passengers.
(b) More load capacity.
(c) The design height of the suspension does not vary, maintaining the vehicle with or without load at the same height.
(d) The useful life of the vehicle is lengthened because the fatigue forces are diminished.
(e) Greater safety from the fast recovery of stability of the vehicle.
(f) Lengthening the useful life of the tires and maintaining the vehicle stable and in alignment.
(g) Minimizing the effect of vibrations which originate from changes in the asphalt layers.

A further object of this invention is to improve the piston, the cover of the cylinder, the guide base of the emergency valve and upper cover, with which a direct coupling of the rocker arm is achieved. The rocker arm is at the same time the receiver and transmitter of the force to the hydro-pneumatic shock absorber. This is different from the previous design in which the rocker arm was coupled by means of a link or connecting rod, thereby requiring the use of sliding channels and guides for the sliding end of the hydro-pneumatic shock absorber and being disadvantageous.

Another object of this invention is to improve the carrying member (in the front suspension in this case) to save space and support mountings of the radial struts. The lateral sections of the carrying member are used, to house and support the upper radial strut end.

Other objects, advantages and salient features of the present invention will become apparent from the following detailed description, which taken in conjunction with the annexed drawings, discloses preferred embodiments of the present invention.

BRIEF DESCRIPTION OF THE DRAWINGS

Referring to the drawings which form a part of this original disclosure.

DETAILED DESCRIPTION OF THE INVENTION

Figure 1:
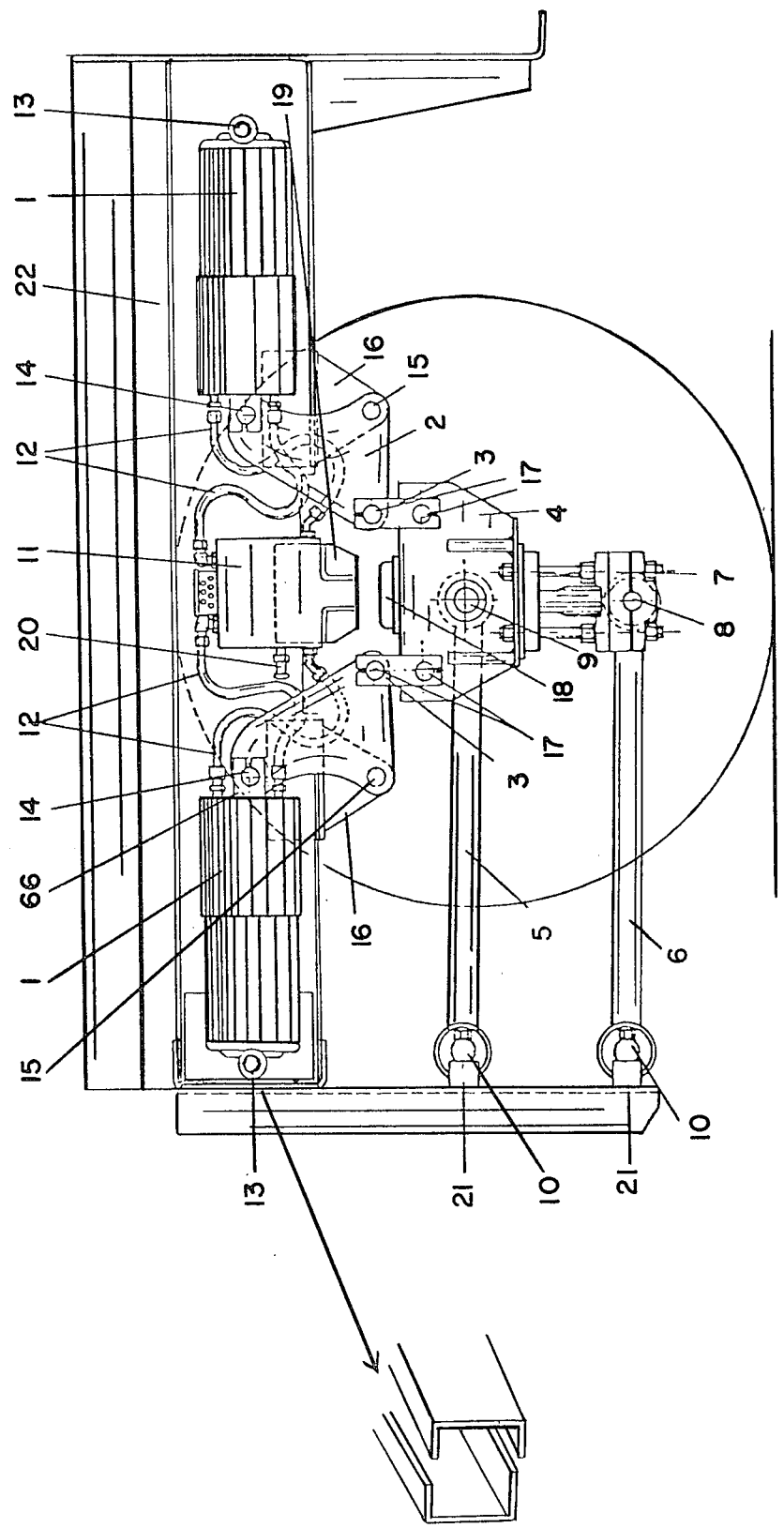
FIG. 1 is an elevational view of a front suspension in accordance with the present invention.

Referring to FIG. 1, the front suspension comprises a combination of two shock absorbers 1 per wheel which function hydro-pneumatically and are equipped with a device which permits a fast recovery of stability lost from the effects of sudden swerves or curves taken at high speeds. The shock absorbers 1 are installed inside the case formed by two sections of the chassis 22. The chassis 22 is in the form of two Cs facing each other. With the upper skid wider than the lower one, it is possible to have these sections joined or separated at the top. Hangers 16 are bolted to the lower skids of the C-shaped channels to serve as supports for the rocker arms 2. Each hanger 16 is composed of two sections which are bolted to the bottom part of each section of chassis.

Each rocker arm 2 is in the form of a triangle with its apexes rounded and has three articulations. One articulation is provided by the pins 15 which pivotedly support the rocker arms 2 on the hanger 16. The hanger 16 is fixed on the chassis 22. A second articulation is the receiver and transmitter of the load or force of the hydro-pneumatic shock absorber 1 and comprises the pin 17 to which the swings 3 are coupled. The third or upper articulation is coupled directly to the supports of the upper cover of the hydro-pneumatic shock absorber 1 and comprise the pins 14 to which the upper arms 2 are coupled. The coupling and position of the articulations converts the vertical pivoting movement to a horizontal movement. The loads and forces are received by the two swings 3 which are coupled to the carrier 4 and the rocker arms 2 by the pins 17. Between the two swings 3, the carrier 4 has a protective rubber stop 18.

The carrier 4 is coupled and fixed on the axle of the vehicle to transmit to it all the pivoting movements. It is formed by two Z sections facing each other with a space therebetween that allows the end of the upper radial brace 5 to be housed by the pin 9. The carrier 4 is fixed to the axle by means of four bolts which extend downwards to support the support 7. The support 7 comprises two sections in the form of a bearing to which the corresponding end of the lower radial brace 6 is coupled by pin 8.

The braces 5, 6 at the ends opposite pins 9, 8, respectively, are fixed by the pins 10 to a support which extends down from the upper part of the chassis. The support has fixing points or steel heels 21, at a convenient height to allow for the best functioning of the suspension.

The ends of the chassis 22 have two anchoring points 13 for the hydro-pneumatic shock absorbers 1. A sufficiently large space is left between the shock absorbers 1 to place a reserve oil tank 11 to supply the hydro-pneumatic shock absorbers. This tank 11 is bolted to a support 19, which in turn is bolted to and between both sections of the chassis. The lower part of the support 19 serves as a stop and support for the rubber heel 18 which is fixed on the upper part of the carrier to limit the pivoting travel to protect the entire mechanism from damage. On one side, the tank 11 has an oil level valve 20 for controlling the oil flow which will be suctioned and returned by the hydro-pneumatic shock absorbers 1 through the hoses 12.

Figure 2:
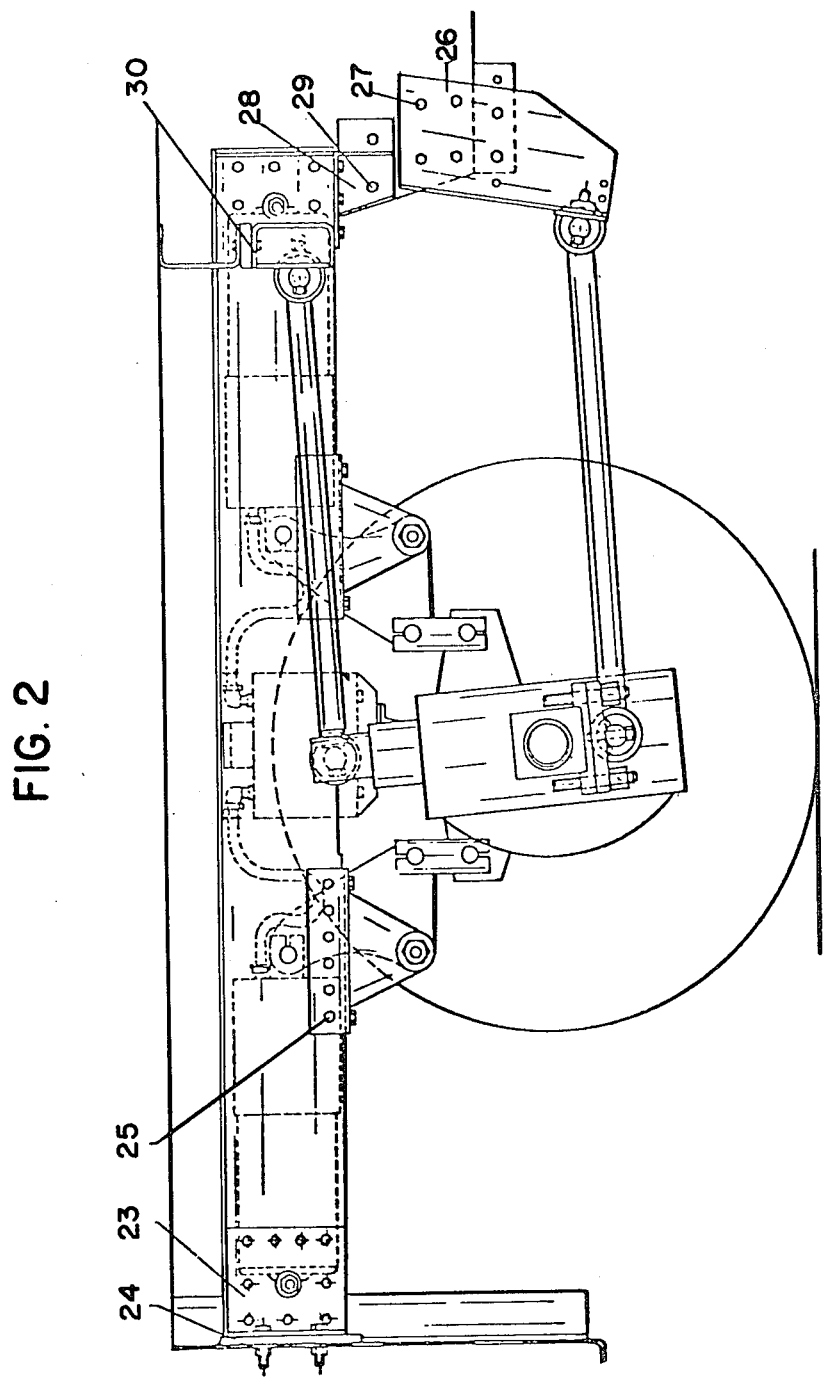
FIG. 2 is an elevational view of a rear suspension in accordance with the present invention.

With reference to FIG. 2, the rear suspension has the same parts that comprise the front suspension. Those parts have the same function and differ only in the position of the radical braces. The upper brace is fixed to a support welded to the highest part of the upper back alse. The lower brace is fixed to the same support as the carrier of the rear suspension. The extreme ends of the hydro-penumatic shock absorbers 1 are secured to the chassis 22 by support plates 23 and bolts. The bolts 24 fix the chassis 22 to the body structure. The bolts 25 secure the hangers 16 to the chassis 22. The hanger or support 26 of the lower radial strut is held by bolts 27 to the support reinforcement 28 to join the support 26 to the chassis and body. The bolts 29 secure the reinforcement support and bridge support 30 to the upper radial brace.

Figure 3:
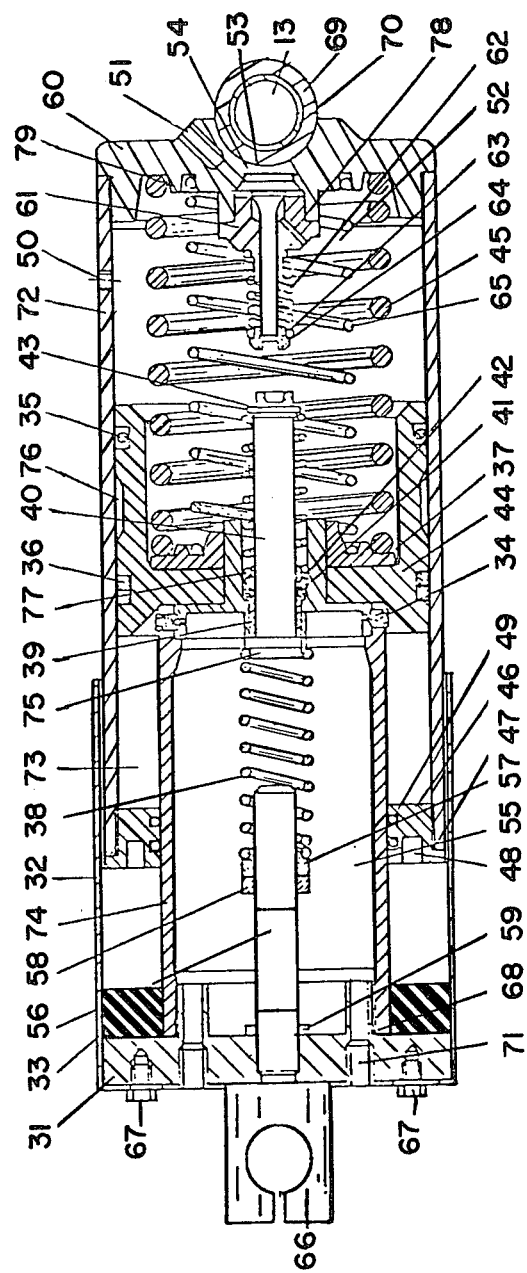
FIG. 3 is an elevational view in cross section of an hydro-pneumatic shock absorber according to one embodiment of the present invention.

With reference to FIG. 3, each shock absorber 1 is formed with a cylinder 72 which forms the main body of the hydro-pneumatic shock absorber 1. Within the cylinder 72, a piston 44 is coupled to a piston rod 74. The piston rod 74 is at the same time a reservoir for oil which will lubricate the cylinder and piston, and acts as a shock absorber liquid with the violent movements of the vehicle. This piston rod 74 is cylindrical in shape and has a threaded part at one end where the upper cover 31 is threaded. On the other end, the interior and exterior diameter of the piston rod 74 is reduced considerably, to form on the outside a step. The step will serve as seat and base for the piston 44 when it is coupled thereon. This smaller diameter section has a threaded section on its end, leaving one section without thread. The unthreaded section passes through a bore in the head of the piston to serve as a guide. Both parts are secured by a nut, which as well as holding these two parts together, is a guide for the master spring 45 and an optional auxiliary spring 65. The piston rod 74 has, near the end which serves as base in the larger diameter section or portion, a seres of orifices about the entire periphery, in some of which small non-return or retention valves 34 are located to control the flow of oil to and from the shock absorber chamber 73. Inside the piston rod 74 itself, the head 75 and part of another piston rod or rod member 40 is housed which is smaller and of lesser diameter than the piston rod 74. The piston rod 40 is between the hydraulic chamber 55 and the pneumatic chamber 52. The head 75 of the piston rod 40 forms at the same time the guide and base to the corresponding end of an opposed spiral spring 38. The other side of the spring 38 is supported and guided by bolt 56 which is threaded on both ends. One threaded end is screwed to the lower part of the upper cover 31 and secured with a lock nut 59. The other end of bolt 56 has a nut 57 and lock nut 58 which serve to hold and guide the spring 38 and to adjust the pressure that it should exert against the head 25 of the piston rod 40. The piston rod 40 has a cap 39 to serve as a guide. This cap 39 is made of a soft metal or other appropriate material and is housed in a case 42 machined for this purpose near the end of lesser diameter section or portion of the piston rod 74. The case 42 increases in diameter to hold a part that has a seal 41 to prevent the passage of oil from the hydraulic chamber between the guide of the head 75 of the piston rod 40 and the rod itself, to the pneumatic chamber and vice versa. The seal 41 serves as a base and guide for the corresponding end of the opposed spiral spring 77. The opposite end of spring 77 is supported and guided by a lock nut which also serves to secure the adjusting screw 43. The adjusting screw 43 is the lug that will open the valve 53 (emergency valve) in critical moments.

The opposing spring 77 in addition to being auxiliary to the spring 38, serves to maintain the seal 41 and its case 42 in their proper places.

The piston 44 has a machined case in its upper part which serves as a base for the piston rod 74. The head of the piston 44 protects the small valves 34 since they are housed inside the case to be protected from possible damage if they touch the piston 44 or the upper cover of the cylinder 46. The lower central part of the piston 44 forms a case which houses in its interior a section of the master spring 45. The master spring 45 has as its base the nut which holds the piston rod 74 to the piston 44. Between the upper and lower parts of the piston 45 is a sufficient thickness to withstand the forces to which it will be submitted. Housing part of the spring 45 inside the piston helps to enlarge as much as possible the free space in the pneumatic chamber 52 which is at the same time housing the master spring 45 and allows a great increase in the load capacity of the hydro-pneumatic suspension. At the bottom and at the sides, the piston 44 has the formed seat and adjustment to hold the piston rod and the piston 37 which is the guide to the master and auxiliary springs 45, 64. On the periphery of the piston 44, there are a number of grooves that have been machined to serve as housings for some metallic rings 36 and seals 35 of a soft material such as rubber, neoprene, etc. to obtain a perfect seal between the cylinder 72 and the piston 44 to isolate the hydraulic chamber 55 from the pneumatic chamber 52. The periphery of the piston 44 also has a case 76 for oil formed between the grooves 35 and the rings 36 to protect the piston 44 and the cylinder 72 in the possible case of suffering a loss of oil.

The pneumatic chamber 52 has two inlets 50, 51 for compressed air. Inlet 50 is for normal operation and is controlled by a valve to regulate the height, and at relatively low pressures. On the other side there is the direct inlet 51 for high pressure which allows for a recuperative force which is almost instantaneous at the moment of a sudden swerve that could endanger the vehicle by turning over. When the vehicle leans slightly to one side, the piston rod 40 decends until the lug of the screw 43 touches the upper part of the emergency valve 53. This opens emergency valve 53 instantly to allow the passage of high pressure air to cause the vehicle recover its lost stability. In the center of the lower cover 60, the emergency valve 53 forms an assembly with its guide 61 and has a seat 54. The seat 54 can be machined or be made of some soft material which will allow the emergency vlave 53 to form a perfect seal when it should reman closed. This seat 54 is formed on the edge of a throat that that has a series of orifices 78. Air passes through orifice 78 and immediately into the inside of the pneumatic chamber 52 simply by touching the tip of the piston rod 40 to the end of valve 53. The valve 53 also has communication with the inlet 51 for high pressure air directed from the reserve tanks of the vehicle. On its upper part, the emergency valve 53 has a machined seat 63 for the spring 62. The catch of the emergency valve and the wedges 64 in the shape of conical half moons secure the seat of the spring 62 of the emergency valve.

The interior of lower cover 60 also has the base and guide 79 of the master spring 45 and the auxiliary spring 65 in case it is used. On the outside of the cover 60, a cap or projection 69 and a cap 70 for articulation between the pin 13 and the hydro-pneumatic shock absorber 1 are provided.

The upper cover 31 of the shock absorber 1 has a support 66 made up of two sections in which the rocker 2 is coupled (see FIG. 1). The cover 31 has two threaded holes 71 in which the connections and supply hoses for the hydraulic fluid are assembled to supply the hydraulic chamber 55 cushion the violent bumps of the vehicle when it passes through pot holes or protuberances on the road. This chamber 55 is formed in the space which the piston displaces in its descent. It becomes larger as the piston decends since it is formed precisely between the piston (44) and the upper cover (46) of the cylinder and where the piston rod (74) travels. The cover (46) has a cavity (48) and some grooves in which some seals 49 are installed to prevent leaking of oil between the cover (46) and the piston rod (74). The oil passing through the small retention valves (34) comes from the interior of the piston rod 74 and is supplied by the oil tank (11) (see FIG. 1), through the supply lines (71) during the decending movements of the piston (44) when it is returned to its original storage place with the ascending bumps and movements of the vehicle. By restricting the passage of oil through the valves 34, as is necessary, the sharp movements of the vehicle are cushioned.

In order to protect the upper cover 46 of the cylinder 72 and the upper cover 31 of the shock absorber 1 bolted to the piston rod 74 from possible collision, there is a rubber heel 33 of appropriate diameter and thickness. The upper cover 31 has a protective cover fixed thereto by bolt 67 on the flat part of the upper cover 31 to protect the piston rod from foreign material, such as water, earth, mud, etc.

Figure 4:
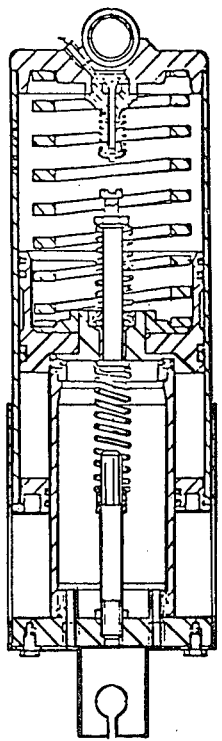
FIG. 4 is an elevational view in cross section of an hydro-pneumatic shock absorber in accordance with a second embodiment of the present invention.

Referring to FIG. 4, a modified shock absorber 1 is shown. The shock absorber of FIG. 4 differs from that of FIG. 3 in having only one master spring of rectangular cross section and in not having the optional auxiliary spring.

Both in FIG. 1 and in FIG. 2, are shown the assembled suspensions seen from one side. The position of the rocker arms 2 is clearly shown. The distance that remains between the carrier 4 and the support 19 of the reserve oil tank 11, which also serves as a stop for the rubber heal 18 fixed above the carrier 4, increases with the pivoting movement of the vehicle. The distances illustrated in FIGS. 1 and 2, are those of the vehicle when it is loading its weight on the suspension and of the hydro-pneumatic shock absorbers 1 approximately half way on their stroke to leave space and stroke for drops and bumps, caused by potholes and bumps in the road. The vertical movement is converted in a horizontal movement by the shape and mounting of the rocker arms 2 and the hangers 16 which serve as anchoring points.

FIGS. 3 and 4 illustrate the hydro-pneumatic shock absorbers 1 in the same position as in the FIGS. 1 and 2, i.e., at their normal design height, or half the stroke or the working position. The space between the piston 44 and the upper cover 46 of the cylinder 72 is the shock absorbing chamber 73. The chamber 73 will be flooded with oil, to lubricate the piston 44 and the cylinder 72 and to cushion the violent rising movements of the piston 44. As the piston 44 slides upwardly with the violent bumps of the vehicle and compresses the oil against the upper cover 46 of the cylinder 72, the flow of oil from chamber 73 will be restricted by a series of small orifices, some of which are equipped with some small retention valves 34. This will break the free flow of the oil and cushion the violent bumps of the vehicle. In drops the opposite happens. A larger number of small valves 34 open in the downward stroke, and by means of the suction of the piston, oil coming from the reserve tank 11 passes through the piston rods 74 to keep the piston rods 74 always full, and through the orifices and small valves 34 to flood once more the chamber 73. This cycle will be repeated continuously as long as the vehicle is moving. The length of the cycle will depend on the state of the road, and the speed with which pot holes and bumps are passed over.

On waves and settlements of the road, the stroke will be more but smoother. In the long descents, the drops may be arrested as the emergency valve is opened and pressure increases in the pneumatic chamber.

The pneumatic chamber (52) is supplied with compressed air at low pressure by a height leveling valve (which does not form part of this invention) to form a cushion of air in the space that remains between the lower part of the piston (44) and the lower cover 60 of the cylinder (72). The cushion of air is assisted by the master spring 45 and the auxiliary spring 65 in the case where it is used to provide a very smooth action. In the case of an emergency, for example, when swerving abruptly or taking a curve at high speed, the action of centrifugal force tends to make the vehicle lean to one side. As the vehicle starts to lean, the hydro-pneumatic shock absorbers 1 start to close and the piston rod 40 which depends from the lower part of the piston, makes contact with the emergency valve 53 to open it and allow high pressure air to enter through a series of orifices 78 made expressly for this purpose, in the throat of the valve guide 61. This allows the high pressure air to enter the pneumatic chamber 52 to regain the lost stability of the vehicle by making the suspension extremely rigid for brief moments while the overload against that side lasts, but once the moment is passed which could have been dangerous for the vehicle and its occupants, the pressure injected into the pneumatic chamber will escape to the outside through the same outlets of the height leveling valve, and the soft smooth action of the suspension returns immediately.

The hydro-pneumatic shock absorber is very versatile, as it can be installed in accordance with the vehicle, in various positions, horizontally as shown in FIGS. 1 an 2, obliquely or vertically, depending on the mounting needs and the vehicle.

While particular embodiments have been chosen to illustrate the invention, it will be understood by those skilled in this art that various changes and modifications can be made therein without departing from the scope of the invention as defined in the appended claims.

I claim:

1. A hydro-pneumatic suspension for an automotive vehicle having a plurality of wheels, comprising:
   a chassis having two C-shaped sections which face each other forming a housing and which have upper and lower flanges, said upper flanges being wider than said lower flanges;
   at least one carrier means fixed to an axle for a wheel and coupled to said chassis by support means; and
   first and second hydro-pneumatic, mechanical shock absorbers coupled to each said carrier by pivoting means and to said chassis and enclosed in said housing, each of said shock absorbers having a spring oriented such that said spring of said first shock absorber opposes said spring of said second shock absorber.

2. A hydro-pneumatic suspension according to claim 1, wherein said pivoting means comprises:
   first and second hangers fixed to said chassis;
   first and second rocker arms pivotally coupled to said first and second hangers, respectively; and
   first and second swings pivotally coupled to said first and second rocker arms, respectively, and to said carrier means.

3. A hydro-pneumatic suspension according to claim 2, wherein said first and second rocker arms are triangular and are pivotally coupled directly to said first and second shock absorbers, respectively.

4. A hydro-pneumatic suspension according to claim 1, wherein a protective rubber stop means is mounted on said carrier.

5. A hydro-pneumatic suspension according to claim 1, wherein said support means comprises:
   a support member fixed to and depending from said chassis;
   a bearing support comprising two sections fixed to and below said carrier means by bolts; and
   upper and lower radial struts, one end of each of said struts being coupled to spaced points on said support member, the other end of said upper strut coupled to said carrier means, the other end of said lower strut coupled to said bearing support.

6. A hydro-pneumatic suspension according to claim 5, wherein said carrier means comprises two Z-shaped sections facing each other and defining a space therebetween, said other end of said upper strut secured in said space by a pin.

7. A hydro-pneumatic suspension according to claim 1, wherein a reserve oil tank is fixed to a support between said shock absorbers and has an oil level valve on one side thereof.

8. A hydro-pneumatic suspension according to claim 1, wherein said shock absorbers are aligned and oppositely oriented.

9. A hydro-pneumatic suspension for an automotive vehicle having a plurality of wheels, comprising:
   a chassis;
   at least one carrier means fixed to an axle for a wheel and coupled to said chassis by support means; and
   first and second hydro-pneumatic, mechanical shock absorbers coupled to each said carrier by pivoting means and to said chassis, each of said shock absorbers having a spring oriented such that said spring of said first shock absorber opposes said spring of said second shock absorber, each of said shock absorbers having
   a hollow cylindrical body;
   a piston mounted in the interior of said body;
   a hollow cylindrical piston rod coupled to said piston, said cylindrical piston rod having a large diameter portion and a reduced diameter end portion forming a step which serves as a seat for the piston;
   upper and lower covers, said upper cover being fixed to a free end of said large diameter portion of said cylindrical piston rod and having inlet means for supplying hydraulic pressure;
   an emergency valve mounted in said lower cover, said cover having a valve seat, a high air pressure inlet, and series of orifices about said seat in fluid communication with said air inlet and the interior of said cylinder, said valve having a spring coupled thereto to bias said valve towards a closed position.

10. A hydro-pneumatic suspension according to claim 9, wherein each said upper cover has a support comprising two sections coupling each said upper cover to one of said rocker arms.

11. A hydro-pneumatic suspension according to claim 9, wherein each of said shock absorbers further comprises:

a series of orifices in said large diameter portion of said cylindrical piston rod adjacent said reduced diameter end portion;

bypass and retention valves mounted in at least some of said orifices in said large diameter portion;

a small piston rod member mounted inside of said cylindrical piston rod, having a head at one end thereof, said piston rod member mounted in a cap in said cylindrical piston rod large diameter portion forming a seal;

a bolt member threaded on both ends thereof with one end fixed to said upper cover and the other end having a nut and lock nut threaded thereon; and a spring having one end coupled to said bolt member and the other end coupled to said head of said piston rod member.

12. A hydro-pneumatic suspension according to claim 9, wherein said piston has a case formed in a lower, central portion thereof, a seat and adjustment means to secure said piston and said cylindrical piston rod, and a series of grooves on the periphery thereof to receive sealing rings and to form a small case for oil; and wherein a master spring is housed in said piston case.

13. A hydro-pneumatic suspension according to claim 11, wherein each of said shock absorbers further comprises:

a shock absorbing chamber in fluid communication with the interior of said cylindrical piston rod through said bypass and retention valves; said shock absorbing chamber being located about said cylindrical piston rod, within said cylindrical body and between said piston and an intermediate cover coupled to one end of said cylindrical body.

14. A hydro-pneumatic suspension system according to claim 13, wherein said intermediate cover has a central aperture in which said large diameter portion of said cylindrical piston rod is slidably received; and wherein sealing means for preventing the escape of oil from said shock absorbing chamber is provided between said intermediate cover and said large diameter portion of said cylindrical piston rod.

15. A shock absorber for a hydro-pneumatic suspension which comprises:

a hollow cylindrical body;

a piston mounted in the interior of said body;

a hollow cylindrical piston rod coupled to said piston, said cylindrical piston rod having a large diameter portion and a reduced diameter end portion forming a step which serves as a seat for the piston;

upper and lower covers, said upper cover being fixed to a free end of said large diameter portion of said cylindrical piston rod and having inlet means for supplying hydraulic pressure;

an emergency valve mounted in said lower cover, said cover having a valve seat, a high air pressure inlet, and series of orifices about said seat in fluid communication with said air inlet and the interior of said cylinder, said valve having a spring coupled thereto to bias said valve towards a closed position.

16. A shock absorber according to claim 15, wherein said upper cover has a support comprising two sections for coupling said upper cover to a rocker arm.

17. A shock absorber according to claim 15, which further comprises:

a series of orifices in said large diameter portion of said cylindrical piston rod adjacent said reduced diameter end portion;

bypass and retention valves mounted in at least some of said orifices in said large diameter portion;

a small piston rod member mounted inside of said cylindrical piston rod, having a head at one end thereof, said piston rod member mounted in a cap in said cylindrical piston rod large diameter portion forming a seal;

a bolt member threaded on both ends thereof with one end fixed to said upper cover and the other end having a nut and lock nut threaded thereon; and a spring having one end coupled to said bolt member and the other end coupled to said head of said piston rod member.

18. A shock absorber according to claim 17, which further comprises:

a shock absorbing chamber in fluid communication with the interior of said cylindrical piston rod through said bypass and retention valves; said shock absorbing chamber being located about said cylindrical piston rod, within said cylindrical body and between said piston and an intermediate cover coupled to one end of said cylindrical body.

19. A shock absorber according to claim 18, wherein said intermediate cover has a central aperture in which said large diameter portion of said cylindrical piston rod is slidably received; and wherein sealing means for preventing the escape of oil from said shock absorbing chamber is provided between said intermediate cover and said large diameter portion of said cylindrical piston rod.

20. A shock absorber according to claim 15, wherein said piston has a case formed in a lower, central portion thereof, a seat and adjustment means to secure said piston and said cylindrical piston rod, and a series of grooves on the periphery thereof to receive sealing rings and to form a small case for oil; and wherein a master spring is housed in said piston case.

* * * * *